June 24, 1930.  B. F. SHIELDS ET AL  1,767,621
FRICTION BRAKE
Filed Aug. 2, 1927  2 Sheets-Sheet 1
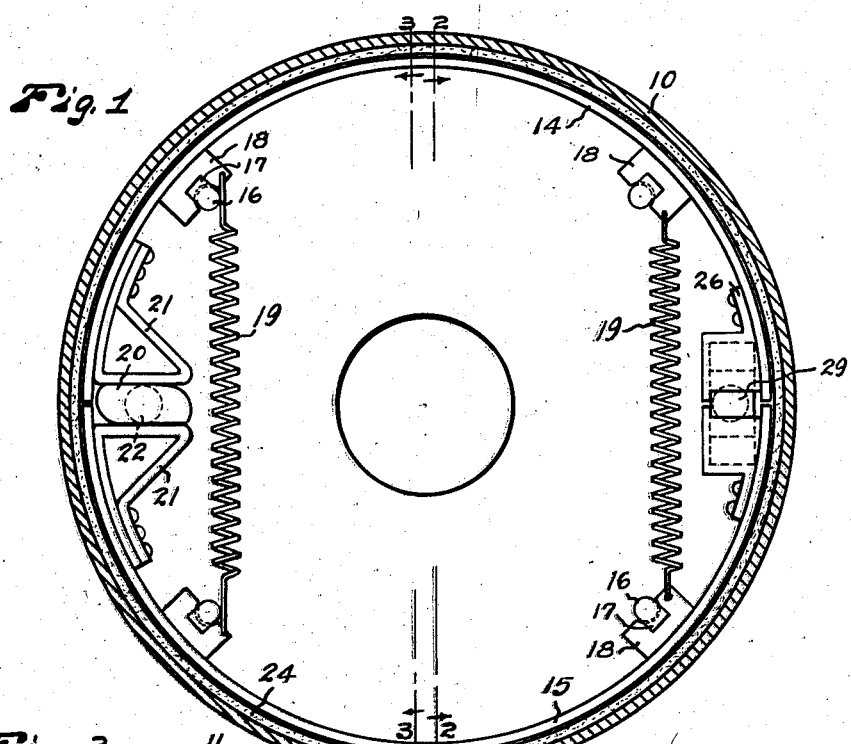
Fig. 1
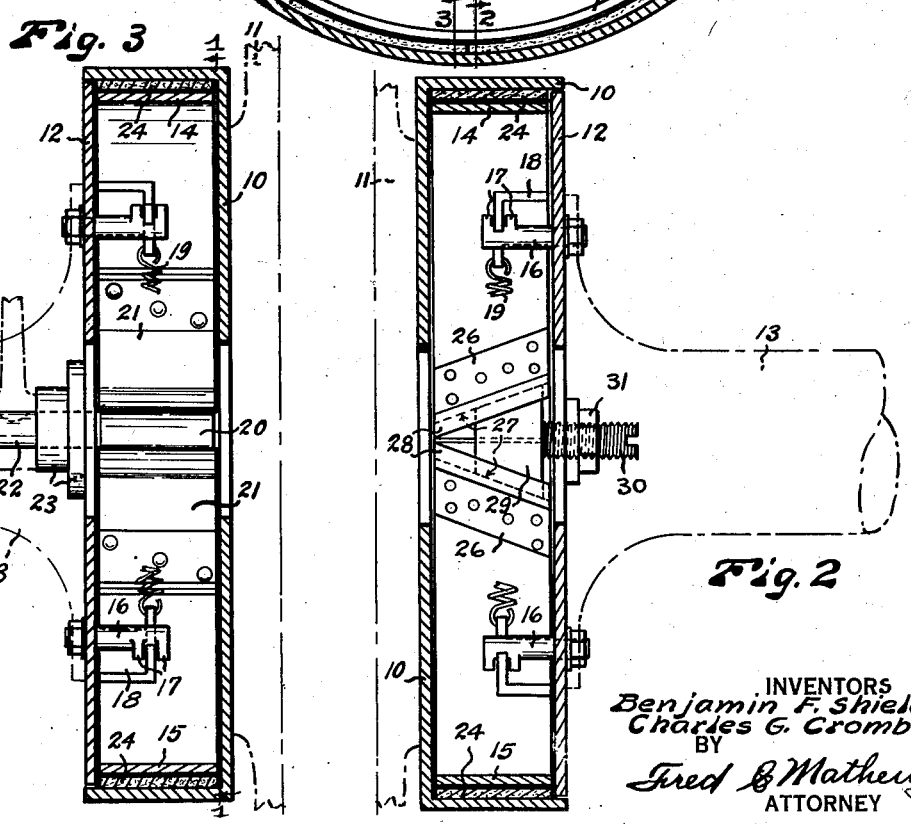
Fig. 3
Fig. 2
INVENTORS
Benjamin F. Shields
Charles G. Crombie
BY
Fred B. Matheny
ATTORNEY June 24, 1930.  B. F. SHIELDS ET AL  1,767,621
FRICTION BRAKE
Filed Aug. 2, 1927    2 Sheets-Sheet 2

INVENTORS
Benjamin F. Shields
Charles G. Crombie
BY
Fred C. Matheny
ATTORNEY

Patented June 24, 1930

1,767,621

UNITED STATES PATENT OFFICE

BENJAMIN F. SHIELDS AND CHARLES G. CROMBIE, OF SEATTLE, WASHINGTON

FRICTION BRAKE

Application filed August 2, 1927. Serial No. 210,043.

Our invention relates to improvements in brakes of the type in which a brake lining of tough wear resistant material having a high coefficient of friction is gripped between two relatively movable parts, as between a brake drum and a shoe or band.

The object of our invention is to provide a brake of this nature in which the brake lining is unattached and floats freely between the two brake members with which it coacts and is not riveted or otherwise secured to said brake members.

Another object is to provide a brake of the internal shoe type which is equipped with floating means for adjusting the brake shoes individually, said adjusting means leaving the brake shoes free to shift their position within the drum so that they will bear with equal pressure against all parts of the floating brake lining throughout substantially an entire circle.

Other and more general objects are to increase the efficiency of brakes of this nature by providing a brake lining that has contact with the cooperating brake parts throughout substantially an entire circle, and to provide a brake lining that is very easily installed and removed in lining or relining the brakes, no special tools and no skill being required in removing an old lining or inserting a new one.

In brakes of the type commonly used on motor vehicles it is common practice to secure the brake lining to the brake shoes or brake bands by means of rivets. This necessitates the expenditure of considerable time and labor in installing the new linings and removing the old ones and further calls for the services of a skilled workman and the use of tools and equipment. Where the linings are secured to one of the cooperating brake parts, it is apparent that the wear is all taken on one side of the lining no wear being possible on the side adjacent the member to which the brake lining is made fast. It is further impossible, where the brake lining is cut in sections and secured to brake shoes, to have the lining in contact with the brake drum for the full three hundred and sixty degrees circumference of the drum, it being apparent that the ends of the lining sections can not be overlapped when the brake shoes are in the contracted position and that there will be a space between the ends of the lining sections when the brake shoes are expanded. Our invention overcomes all of the objectionable features hereinbefore pointed out by providing a full floating brake lining that may be quickly and easily slipped into or out of place, that may wear evenly both on the brake shoes and the brake drum, the wear being on both sides of the lining, and that will have a bearing throughout the entire three hundred and sixty degrees of circumference of the brake drum and substantially the entire circumference of the brake shoes.

In the accompanying drawings, Fig. 1, is a view partly in cross section and partly in elevation on broken line 1—1 of Fig. 3 of brake mechanism constructed in accordance with my invention.

Fig. 2 is a sectional view on broken line 2—2 of Fig. 1, parts being shown in elevation and the position which other parts may occupy being shown by dotted lines.

Fig. 3, is a sectional view on broken line 3—3 of Fig. 1, parts being shown in elevation.

Figure 4:
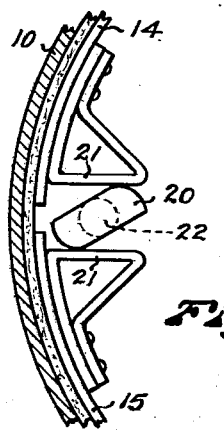
Fig. 4, is a fragmentary sectional view showing the brake shoes expanded.

Referring to the drawings, throughout which like reference numerals designate like parts, 10 designates a brake drum of the usual form, such as is ordinarily secured to the wheel 11 of a motor vehicle so as to rotate therewith and 12 designates a plate adapted to form a closure for the open end of the drum 10, the plate usually being rigid with a fixed part of the vehicle, as with an axle housing 13. Two semicircular brake shoes 14 and 15 are disposed within the drum 10 and supported by stud bolts 16 which are anchored in the plate 12. The stud bolts 16 have bifurcated ends 17 that fit over angle brackets 18 which are secured to the brake shoes 14 and 15. Springs 19 connected with brackets 18 tend to hold the two brake shoes in retracted position. The brake shoes are forced apart or expanded by a cam 20 that is operatively disposed between two brackets 21 on adjacent ends of the respective brake shoes. The cam 20 also serves as a chief means for withdrawing the torque on the shoes when the brakes are set, said cam being rigid on a shank 22 that extends out through a suitable bearing 23 on the plate 12 and is arranged to be connected with suitable brake operating mechanism, not shown.

Figure 7:
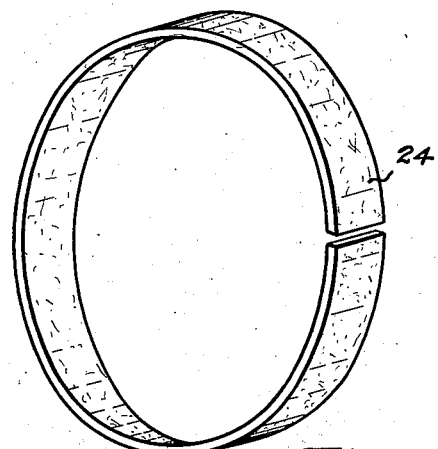
Figs. 7 and 8 are detached perspective views of two forms of linings embodied in the invention.
Figure 5:
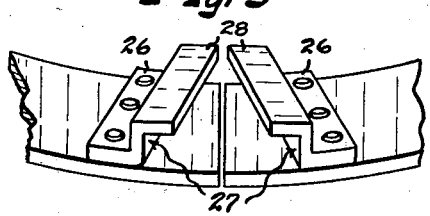
Figs. 5 and 6 are detached perspective views of parts of the floating brake shoe adjusting means embodied in the invention.
Figure 8:
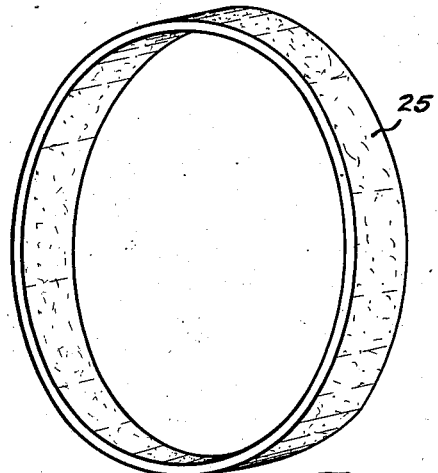
Figure 6:
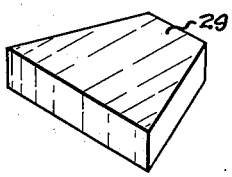

In accordance with our invention we provide a full floating brake lining between the drum 10 and the shoes 14 and 15. This lining may be in the form of a strip 24 of brake lining material just long enough so that its two ends will come together when it is inserted in the brake as shown in Figs. 1 and 7 or it may be in the form of an endless belt 25 of brake lining material of exactly the right size to fit between the brake drum and the brake shoes or band. This lining is not secured in any way either to the brake shoes or to the brake drum and is free to slide on either or both the drum and the shoes. The lining is confined between the brake shoes and the brake drum throughout substantially its entire circumference and, being relatively stiff, it can not kink or double up. The plate 12 on one side and the head of the brake drum 10 on the other side prevent sidewise displacement of the brake lining.

For this brake lining to operate efficiently it is necessary that the expansion of the brake shoes should be even and equal in all directions against the lining. To insure this equal expansion of the brake shoes at all times and to further provide means for adjusting said brake shoes we provide adjusting devices which leave the brake shoes floating and free within the drum in so far as said adjusting devices are concerned. These adjusting devices comprise brackets 26 secured to the ends of the brake shoes diametrically opposite to the expansion cam, said brackets having inclined surfaces 27 that terminate in overhanging flanges 28. A wedge member or block 29 is adapted to fit between the two inclined bracket surfaces 27 and a set screw 30 screws through the plate 12 and is arranged to engage with the wider end of the wedge member 29 to force the same between the inclined bracket surfaces 27 so as to expand or adjust the brake shoes and hold the same in adjusted position. A jamb nut 31 is provided for locking the set screw 30 in adjusted position. This adjusting device leaves the brake shoes 14 and 15 free to float or seek their own position in the drum in so far as the adjusting device is concerned, the end of the wedge block 29 sliding over the end of the set screw 30. This insures that the two shoes will always be expanded with equal pressure against the floating brake lining. Torque is borne by the cam 20.

The brake shoes 14 and 15 are preferably made of slightly flexible spring steel with their outer circumference of slightly less radius than the inner wall of the brake drum so that said shoes will correspond very closely to the curvature of the drum, the shoes will flex slightly and may be adjusted to compensate for wear of the brake lining until said brake lining is worn very thin.

It will be noted that our brake lining, in the endless belt form constitutes a complete circle, and in the strip form constitutes substantially a complete circle, thus affording a maximum area of contact in proportion to a given width and diameter of brake drum and making it possible to secure the maximum brake efficiency in a drum of any predetermined size.

When in use, this brake operates in substantially the same manner as an ordinary brake the retarding effect being due to friction between the brake lining and the contacting surfaces, the lining in our brake being free to slide on both the inner and outer contacting surfaces while in the ordinary brake the wear all takes place on one surface.

The foregoing description and accompanying drawings clearly disclose a preferred embodiment of our invention but it will be understood that this disclosure is merely illustrative and that such changes in the device may be made as are within the scope and spirit of the following claims.

We claim:—

1. The combination with a brake embodying a rotatable brake drum and relatively fixed brake shoes, of floating means for adjusting the brake shoes expansively relative to the drum said floating adjusting means leaving the brake shoes free to find their own position circumferentially of the drum, means for expanding the shoes to set the brakes said expanding means constituting the sole means for resisting the torque of the brake shoes and a brake lining interposed between said shoes and said drum and movable circumferentially relatively to both said shoes and said drum.

2. In a brake, a rotatable drum, a relatively fixed plate at one end of said drum, brake shoes disposed within said drum, means for adjusting the brake shoes expansively within the drum and devices extending outwardly through said plate for positioning said adjusting means, said devices leaving said shoes free to move circumferentially.

3. In a brake, a rotatable drum, two relatively fixed semi circular brake shoes within said drum, cam means operable between two adjacent ends of the shoes for expanding the shoes to apply the brakes said cam means constituting the sole means for resisting the torque of the brake shoes, inclined bearing surfaces at the other two adjacent ends of the shoes, a wedge member movable between said inclined bearing surfaces to adjust said shoes expansively and means adjustable from the exterior of said brake drum for engaging with the wedge member to force the same between said inclined surfaces said means leaving said wedge member and said shoes free to automatically adjust themselves circumferentially within said drum.

4. In a brake, a rotatable drum, a relatively fixed plate at one end of said drum, two semicircular brake shoes disposed within said drum, a floating brake lining interposed between said drum and said shoes, cam means pivoted in the plate and operable between two adjacent ends of the shoes to expand the shoes and apply the brakes and to resist the torque of the same, inclined bearing surfaces at the other two adjacent ends of said shoes, a wedge member movable between said inclined bearing surfaces to adjust the brake shoes expansively and a set screw extending inwardly through said plate and engaging the wedge member to adjust the position of the wedge between the inclined surfaces, the wedge member being movable over the end of the set screw.

The foregoing specification signed at Seattle, Wash., this 18th day of July, 1927.

BENJAMIN F. SHIELDS.
CHARLES G. CROMBIE.